United States Patent
Fripp et al.

(10) Patent No.: US 9,169,716 B2
(45) Date of Patent: Oct. 27, 2015

(54) LIQUID VALVE FOR FLOW CONTROL DEVICES

(71) Applicant: Halliburton Energy Services, Inc., Houston, TX (US)

(72) Inventors: Michael Linley Fripp, Carrollton, TX (US); Luke William Holderman, Plano, TX (US); Jean-Marc Lopez, Plano, TX (US); Liang Zhao, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/072,159

(22) Filed: Nov. 5, 2013

(65) Prior Publication Data

US 2014/0174750 A1 Jun. 26, 2014

Related U.S. Application Data

(63) Continuation of application No. PCT/US2012/071157, filed on Dec. 21, 2012.

(51) Int. Cl.
*E21B 34/10* (2006.01)
(52) U.S. Cl.
CPC ...................... *E21B 34/10* (2013.01)
(58) Field of Classification Search
CPC ......... E21B 36/06; E21B 21/10; E21B 34/06; E21B 34/10; E21B 34/066; F16K 13/10; F16K 31/06; F16K 31/082; F16K 31/08; F16K 99/0057; Y10S 137/909
USPC .................. 166/325, 319, 316; 137/909, 807; 11/325, 319, 316
See application file for complete search history.

(56) References Cited

U.S. PATENT DOCUMENTS

| | | | |
|---|---|---|---|
| 3,010,471 A * | 11/1961 | Gross | 137/251.1 |
| 3,586,104 A | 6/1971 | Hyde | |
| 4,463,502 A * | 8/1984 | Fitzgerald et al. | 34/249 |
| 6,622,794 B2 | 9/2003 | Zisk, Jr. | |
| 6,802,489 B2 * | 10/2004 | Marr et al. | 251/129.14 |
| 6,823,895 B2 * | 11/2004 | Hitchcock et al. | 137/827 |
| 7,338,028 B2 * | 3/2008 | Zimmerling et al. | 251/7 |
| 7,354,528 B2 * | 4/2008 | Cheng et al. | 252/62.52 |
| 7,428,922 B2 * | 9/2008 | Fripp et al. | 166/66.5 |
| 7,521,002 B2 * | 4/2009 | Cheng et al. | 252/62.52 |
| 7,547,415 B2 * | 6/2009 | Hataoka et al. | 422/552 |
| 8,286,705 B2 * | 10/2012 | Ocalan et al. | 166/283 |
| 8,424,598 B2 * | 4/2013 | Roddy | 166/248 |

(Continued)

OTHER PUBLICATIONS

International Patent Application No. PCT/US2012/071157, "International Search Report & Written Opinion", mailed Aug. 21, 2013, 9 pages.

*Primary Examiner* — Shane Bomar
*Assistant Examiner* — Michael Wills, III
(74) *Attorney, Agent, or Firm* — Kilpatrick Townsend & Stockton LLP (57) ABSTRACT

Certain aspects of the present invention are directed to a liquid valve assembly that can be disposed in a wellbore through a fluid-producing formation. The liquid valve assembly can include a housing and a liquid valve. The housing can define an inner chamber and an opening adapted to allow fluid to flow between the inner chamber and a passageway. The liquid valve can be disposed in the inner chamber. The liquid valve can include a yield stress fluid. The yield stress fluid can prevent fluid from flowing between the inner chamber and the passageway.

14 Claims, 7 Drawing Sheets

(56) References Cited

U.S. PATENT DOCUMENTS

| | | | |
|---|---|---|---|
| 8,584,692 B2* | 11/2013 | Hyde et al. | 137/13 |
| 8,857,508 B2* | 10/2014 | Mazyar | 166/66.5 |
| 2002/0174981 A1 | 11/2002 | Den Boer et al. | |
| 2008/0023205 A1 | 1/2008 | Craster et al. | |
| 2011/0214920 A1 | 9/2011 | Vail, III et al. | |
| 2011/0297394 A1* | 12/2011 | VanDelden | 166/373 |
| 2012/0024385 A1 | 2/2012 | Gharaibah et al. | |
| 2012/0067577 A1* | 3/2012 | Roddy | 166/292 |
| 2012/0186813 A1* | 7/2012 | Ohta | 166/285 |
| 2012/0318510 A1* | 12/2012 | Ocalan | 166/300 |
| 2013/0318962 A1* | 12/2013 | Joshi et al. | 60/545 |

* cited by examiner

LIQUID VALVE FOR FLOW CONTROL DEVICES

CROSS-REFERENCE TO RELATED APPLICATIONS

This is a continuation of PCT/US2012/071157, filed Dec. 21, 2012, the entirety of which is incorporated herein by reference.

TECHNICAL FIELD OF THE INVENTION

The present invention relates generally to devices for controlling fluid flow in a wellbore in a subterranean formation and, more particularly (although not necessarily exclusively), to liquid valve assemblies for selectively preventing the flow of formation fluids in producing wells.

BACKGROUND

Wells systems for extracting fluids such as an oil or gas from a subterranean formation can include devices for controlling the rate of fluid flow from a well. Such devices can include valves, such as a flapper valve, for selectively allowing and preventing the flow of fluid. However, debris in the tubing of a well system can obstruct a valve, thereby preventing proper operation of the valve.

It is desirable for a valve to continue regulating the flow of fluid despite the presence of debris in a well system.

SUMMARY

In one aspect, a liquid valve assembly is provided that can be disposed in a wellbore through a fluid-producing formation. The liquid valve assembly can include a housing and a liquid valve. The housing can define an inner chamber and an opening adapted to allow fluid to flow between the inner chamber and a passageway. The liquid valve can be disposed in the inner chamber. The liquid valve can include a yield stress fluid. The yield stress fluid can prevent fluid from flowing between the inner chamber and the passageway.

In another aspect, a liquid check valve assembly is provided that can be disposed in a wellbore through a fluid-producing formation. The liquid check valve assembly can include a housing and a liquid valve. The housing can define an inner chamber, a first opening adapted to allow fluid to flow between the inner chamber and a first passageway, and a second opening adapted to allow the fluid to flow between the inner chamber and a second passageway. The liquid valve can be disposed in the inner chamber. The liquid valve can include a yield stress fluid. A first diameter of the first opening can cause the yield stress fluid to prevent fluid flow between the inner chamber and the passageway in response to fluid exerting a force against the liquid valve in the direction of the first opening. A second diameter of the second passageway can allow fluid to flow from the inner chamber into the second passageway in response to the fluid exerting a force against the liquid valve in the direction of the second opening.

In another aspect, an inflow control device is provided that can be disposed in a wellbore through a fluid-producing formation. The liquid check valve assembly can include a housing and a liquid valve assembly. The housing can define a passageway. The liquid valve assembly can include an additional housing and a liquid valve. The additional housing can define an inner chamber and an opening adapted to allow fluid to flow between the inner chamber and the passageway. The liquid valve can be disposed in the inner chamber. The liquid valve can include a yield stress fluid. The yield stress fluid can prevent fluid from flowing between the inner chamber and the passageway.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and examples of the present invention are directed to a liquid valve assembly that can be disposed in a wellbore traversing through a fluid-producing formation. The liquid valve assembly includes a liquid valve. The liquid valve can include a yield stress fluid, such as (but not limited to) a Bingham plastics, magnetorheological fluids, muds, cements, emulsions, electrorheological fluids, ferro fluids, molten salts, gels, etc. The liquid valve can be disposed in an inner chamber defined by a housing of the liquid valve assembly. The yield stress fluid can have a yield stress that is sufficient to prevent the flow of the yield stress fluid out of the inner chamber. For example, when force is applied to the yield stress fluid in the direction of opening, the yield stress fluid can have a sufficient yield stress that the force is resisted and the yield stress fluid blocks the opening. The yield stress can therefore be sufficient to prevent the fluid from flowing between the inner chamber and the passageway through the opening.

In additional or alternative aspects, the liquid valve assembly can function as a check valve. The housing for the liquid valve assembly can define a first opening and a second opening adapted to allow fluid flow from a first passageway through the inner chamber and into a second passageway. A diameter of the first opening can be sufficient to cause the yield stress of the liquid valve to prevent fluid flow between the inner chamber and the passageway in response to the fluid exerting a force against the liquid valve in the direction of the first opening. A diameter of the second passageway can be sufficient to allow fluid flow from the inner chamber into the second passageway in response to the fluid exerting a force against the liquid valve in the direction of the second opening.

In additional or alternative aspects, the liquid valve can be actuated by an actuation mechanism. The actuation mechanism can include any suitable mechanism for selectively positioning the liquid valve over the opening such that the liquid valve prevents fluid flow between the inner chamber and the passageway.

One non-limiting example of an actuation mechanism is a piston. Pressure from a control line can be communicated to one or more pistons. Communicating pressure to a first piston can cause the first piston to apply a force that closes the liquid valve assembly by positioning the liquid valve over the opening. Communicating pressure to a second piston can cause the second piston to apply a force that opens the liquid valve assembly by positioning the liquid valve over the opening.

Another non-limiting example of an actuation mechanism is an electromagnet or other source of a magnetic field used with a yield stress fluid that is a magnetorheological fluid. A magnetorheological fluid is a fluid that experiences an increase in viscosity and yield stress in response to being subjected to a magnetic field. Activating an electromagnet or other source of a magnetic field can generate a magnetic field at or near the magnetorheological fluid, thereby increasing the yield stress of the magnetorheological fluid and preventing fluid flow between the inner chamber and the passageway. Deactivating the electromagnet or other source can remove or decrease the magnetic field at or near the magnetorheological fluid, thereby decreasing the yield stress of the magnetorheological fluid and allowing fluid flow between the inner chamber and the passageway.

Another non-limiting example of an actuation mechanism is a mechanism for generating a pressure differential across the liquid valve. For example, a pressure bridge network can be used to shift the position of the liquid valve. The pressure bridge network can include a nozzle and a vortex placed in series. The nozzle and vortex being placed in series can generate a pressure differential that shifts directions based on whether water or oil is flowing through the liquid valve assembly. Oil flowing through the valve assembly can cause a pressure differential shifting the liquid valve away from the opening.

Another non-limiting example of an actuation mechanism is a mechanism for applying pressure to a flexible housing in which the liquid valve. For example, a housing can be formed from a rubber or other flexible material. A force can be applied to one end of the housing, thereby compressing the housing. Compressing the housing can apply force to the liquid valve that causes the liquid valve to shift position either toward the opening or away from the opening.

In some aspects, the liquid valve assembly can be disposed in an inflow control device. An inflow control device can be installed with a tubing string of a well system. An inflow control device can include a device or system deployed as part of a well completion. During a production process, the inflow control device can control the rate at which fluids are produced from a subterranean formation in a well system. The inflow control device can be used to balance or equalize wellbore pressure as fluids are produced from a well and to stimulate the flow of production fluids from a subterranean formation by injecting fluid into the subterranean formation via the inflow control device. A liquid valve assembly can be disposed in the housing of an inflow control device that defines a first passageway and a second passageway through which fluid can flow between the formation and the surface.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples. The following sections use directional descriptions such as "above," "below," "upper," "lower," "upward," "downward," "left," "right," "uphole," "downhole," etc. in relation to the illustrative examples as they are depicted in the figures, the upward direction being toward the top of the corresponding figure and the downward direction being toward the bottom of the corresponding figure, the uphole direction being toward the surface of the well and the downhole direction being toward the toe of the well. Like the illustrative examples, the numerals and directional descriptions included in the following sections should not be used to limit the present invention.

Figure 1:
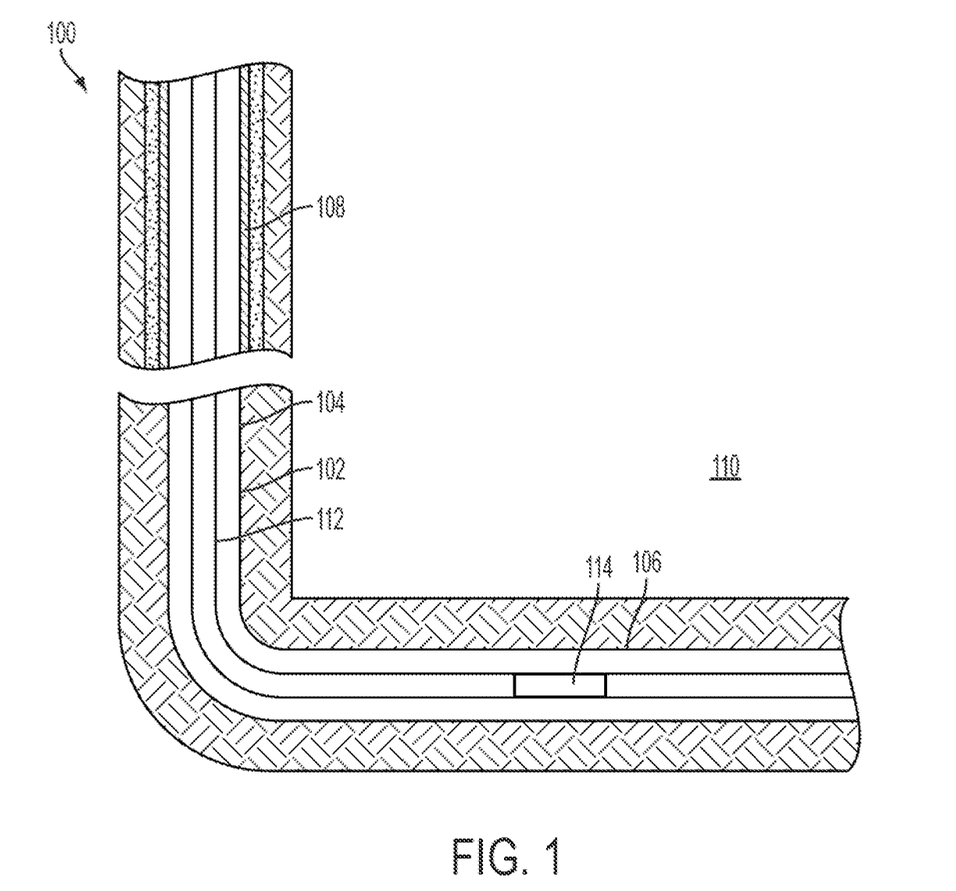
FIG. 1 is a schematic illustration of a well system having inflow control devices according to one aspect of the present invention.

FIG. 1 schematically depicts a well system 100 having an inflow control device 114 in which a liquid valve can be disposed. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

A tubing string 112 extends from the surface within wellbore 102. The tubing string 112 can provide a conduit for formation fluids, such as production fluids produced from the subterranean formation 110, to travel from the substantially horizontal section 106 to the surface. Pressure from a bore in a subterranean formation can cause formation fluids, such as gas or petroleum, to flow to the surface. The rate of fluid flow can be controlled using one or more inflow control devices.

The inflow control device 114, depicted as a functional block in FIG. 1, is positioned in the tubing string 112 at a horizontal section 106. The inflow control device 114 can be coupled to the tubing string 112. The inflow control device 114 can regulate the flow rate from the subterranean formation 110.

Although FIG. 1 depicts the inflow control device 114 positioned in the substantially horizontal section 106, an inflow control device can be located, additionally or alternatively, in the substantially vertical section 104. In some aspects, inflow control devices can be disposed in simpler wellbores, such as wellbores having only a substantially vertical section. Inflow control devices can be disposed in open-hole environments, such as is depicted in FIG. 1, or in cased wells.

Figure 2:
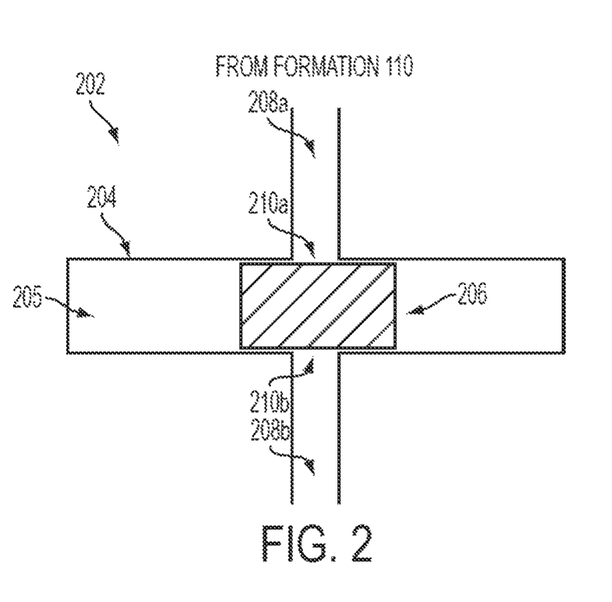
FIG. 2 is a cross-sectional view of a closed liquid valve assembly according to one aspect of the present invention.
Figure 3:
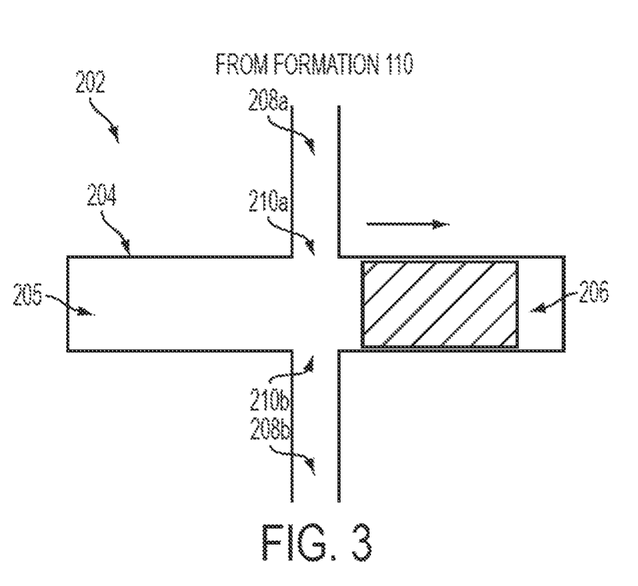
FIG. 3 is a cross-sectional view of an open liquid valve assembly according to one aspect of the present invention.

An inflow control device or other flow control device in a well system 100 can include one or more liquid valve assemblies. FIGS. 2-3 are cross-sectional views of a liquid valve assembly 202. In some aspects, a liquid valve assembly can be disposed in an inflow control device 114. In other aspects, a liquid valve assembly can be disposed in any device, tool, or component of a well system 100 in which the flow of fluid is to be prevented or otherwise restricted.

The liquid valve assembly 202 includes a housing 204 and a liquid valve 206. The housing 204 can define an inner chamber 205 in which the liquid valve 206 can be disposed. A liquid valve assembly 202 in a closed position, as depicted in FIG. 2, can prevent fluid from a formation 110 from flowing through a passageway 208a into the inner chamber 205 via an opening 210a. A liquid valve assembly 202 in an open position, as depicted in FIG. 3, can allow fluid from a formation 110 to flow through a passageway 208a into the inner chamber 205 via an opening 210a and out of the inner chamber 205 via an opening 210b into a passageway 208b. The passageway 208b provides a fluid path to another location in an inflow control device 114 or a tubing string 112.

The housing 204 can be formed from any material suitable for defining an inner chamber 205. In some aspects, the housing 204 can be formed from a rigid material, such as (but not limited to) metal or fiber reinforced composite materials. In other aspects, the housing 204 can be formed from a flexible or compressible material. Non-limiting examples of a suitable flexible or compressible material include plastic or rubber, such as (but not limited to) particle or fiber reinforced plastics and rubbers.

The liquid valve 206 can include a yield stress fluid. A yield stress fluid can include any type of fluid resistant to flowing in the absence of a force applied to the yield stress fluid. A non-limiting example of a yield stress fluid is a Bingham plastic. A Bingham plastic is a fluid that will not flow in the absence of a shear stress. A Bingham plastic behaves like a solid in response to low fluidic force or pressure being applied to the Bingham plastic. The liquid valve 206 can flow around any debris or other obstructions in the inner chamber 205 or the housing 204.

The openings 210a, 210b can have sufficiently small diameters so that a pressure differential between openings 210a, 210b caused by fluid flowing through the passageways 208a is insufficient to cause the yield stress fluid to flow into the passageways 208b through the opening 210b, and vice versa. In some aspects, supports may be added to the openings 210a, 210b. The supports can minimize or otherwise reduce the stress on the liquid valve 206 caused by the pressure differential between the openings 210a, 210b.

An example of a differential pressure that a yield stress fluid such as a Bingham plastic can withstand before flowing is provided by the formula $\Delta P = 3\tau L/g$, where $\Delta P$ is the differential pressure, $\tau$ is a shear strength (i.e., yield stress) for the Bingham plastic, L is a height of the Bingham plastic, and g is the diameter of the openings 210a, 210b. For a diameter of 0.025 inches and a yield stress fluid having a shear strength $\tau$ of 8.7 psi and a height L of 0.25 inches, the supported pressure differential $\Delta P$ is 5000 psi. For a diameter of 0.01 inches and a yield stress fluid having a shear strength $\tau$ of 8.7 psi and a height L of 0.25 inches, the supported pressure differential $\Delta P$ is 6500 psi.

Figure 4:
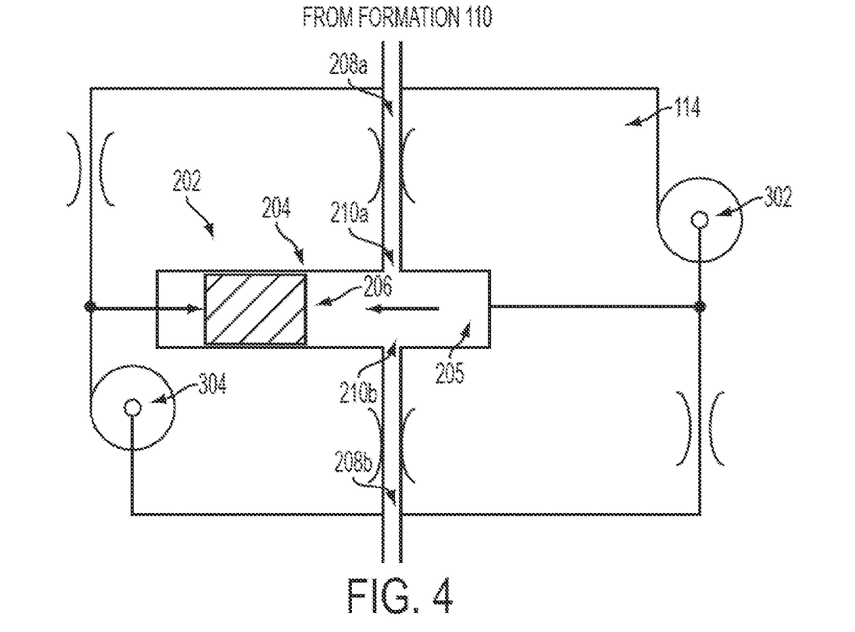
FIG. 4 is a cross-sectional view of an open liquid valve assembly actuated by a pressure bridge network according to one aspect of the present invention.
Figure 5:
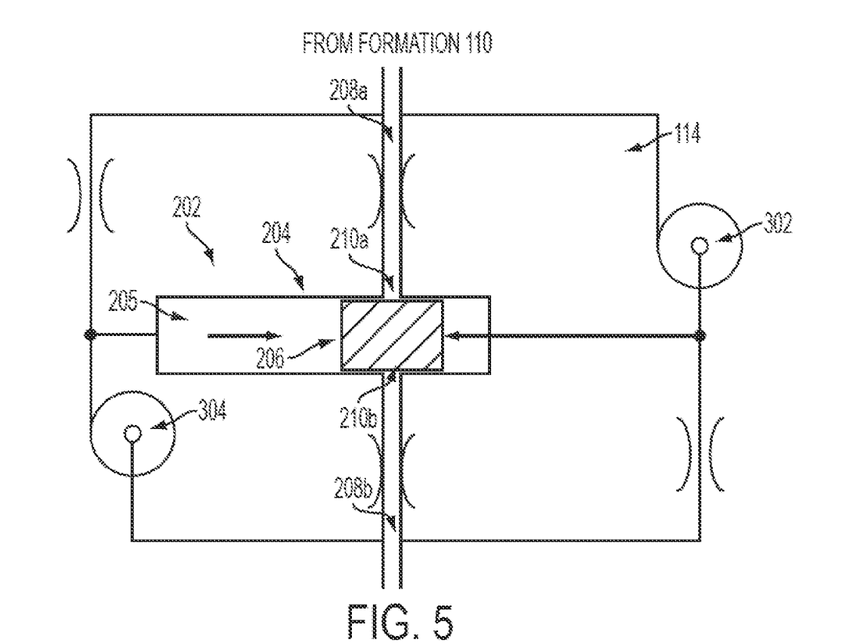
FIG. 5 is a cross-sectional view of a closed liquid valve assembly actuated by a pressure bridge network according to one aspect of the present invention.

The liquid valve assembly 202 can be actuated between an open position allowing fluid flow and a closed position restricting fluid flow via any suitable actuation mechanism. For example, FIGS. 4-5 are cross-sectional views of a liquid valve assembly 202 actuated by a pressure bridge network. A non-limiting example of a pressure bridge network is provided in U.S. patent application Ser. No. 13/217,738. The pressure bridge network can be provided by a nozzle 302 and a vortex 304 of an inflow control device 114. The nozzle 302 and the vortex 304 can be placed in series. The nozzle 302 and vortex 304 being placed in series can cause a first pressure to be exerted on a first side of the liquid valve 206, as indicated by the leftward arrow in FIGS. 4-5, and a second pressure to be exerted on a second side of the liquid valve 206, as indicated by the rightward arrow in FIGS. 4-5. The pressures exerted on each side of the liquid valve 206 can be unequal, thereby generating a pressure differential across the liquid valve 206.

The liquid valve assembly 202 can be actuated to an open or closed position in response to which of the first and second pressures is greater. In a non-limiting example, a flow of oil or other production fluids through the inflow control device 114 can increase the pressure depicted by the leftward arrow in FIGS. 4-5, thereby causing the liquid valve 206 to shift to a position away from the openings 210a, 210b, as depicted in FIG. 4. A flow of water through the inflow control device 114 can increase the pressure depicted by the rightward arrow in FIGS. 4-5, thereby causing the liquid valve 206 to shift to a position blocking the openings 210a, 210b, as depicted in FIG. 5.

Figure 6:
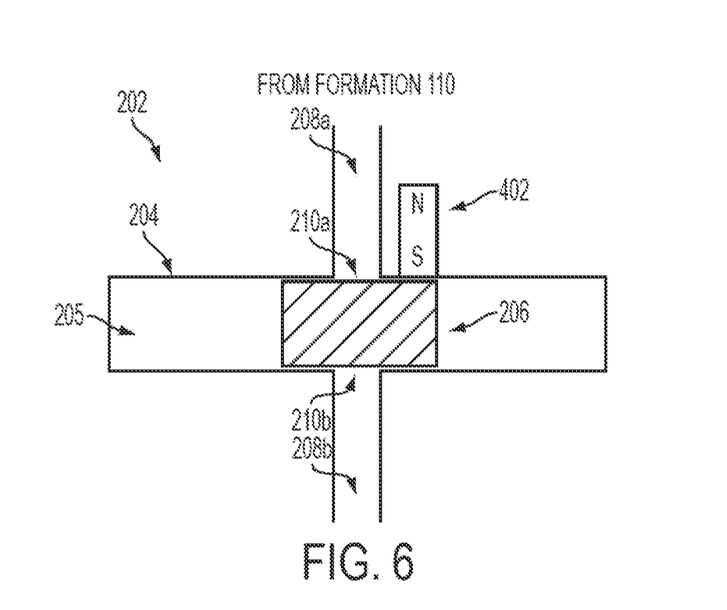
FIG. 6 is a cross-sectional view of a closed liquid valve assembly using a magnetorheological fluid valve according to one aspect of the present invention.
Figure 7:
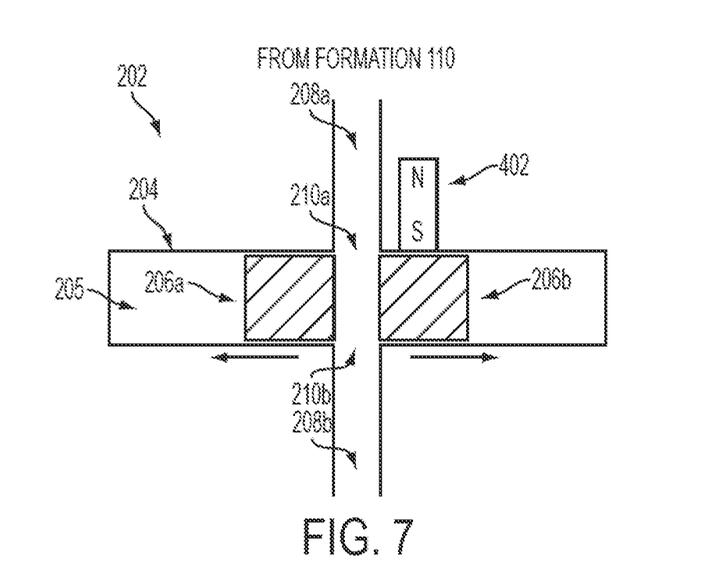
FIG. 7 is a cross-sectional view of an open liquid valve assembly using a magnetorheological fluid valve according to one aspect of the present invention.

In additional or alternative aspects, the liquid valve 206 can include a fluid with a variable yield stress. The liquid valve assembly 202 can be actuated by varying the yield stress of the yield stress fluid of the liquid valve 206. For example, FIGS. 6-7 are cross-sectional views of a liquid valve assembly 202 using a magnetorheological fluid for the liquid valve 206. A magnetorheological fluid is a fluid that experiences an increase in viscosity and yield stress in response to being subjected to a magnetic field. The liquid valve assembly 202 can include an electromagnet 402 or other source of a magnetic field. In some aspects, a permanent magnet may be disposed at another point in the liquid valve assembly 202, such as on the on the left-hand side of the liquid valve assembly 202. Including a permanent magnet in the liquid valve assembly 202 can help separate the fluids in the chamber 205. The electromagnet 402 can actuate the liquid valve assembly 202 by selectively providing a magnetic field. The flux of the magnetic field can be perpendicular to a flow path from the formation 110 through the valve assembly 202. Activating the electromagnet 402 can generate the magnetic field at or near the magnetorheological fluid of the liquid valve 206. The magnetic field can increase the yield stress of the liquid valve 206 such that the liquid valve 206 prevents fluid flow between the inner chamber 205 and the passageways 208a, 208b. Deactivating the electromagnet 402 can remove or decrease the magnetic field. Removing or decreasing the magnetic field can decrease the yield stress of the liquid valve 206. A pressure differential across openings 210a, 210b can be sufficient to cause the liquid valve 206 to separate into portions 206a, 206b. The liquid valve 206 separating into portions 206a, 206b allows the flow of fluid between the inner chamber 205 and the passageways 208a, 208b.

Figure 8:
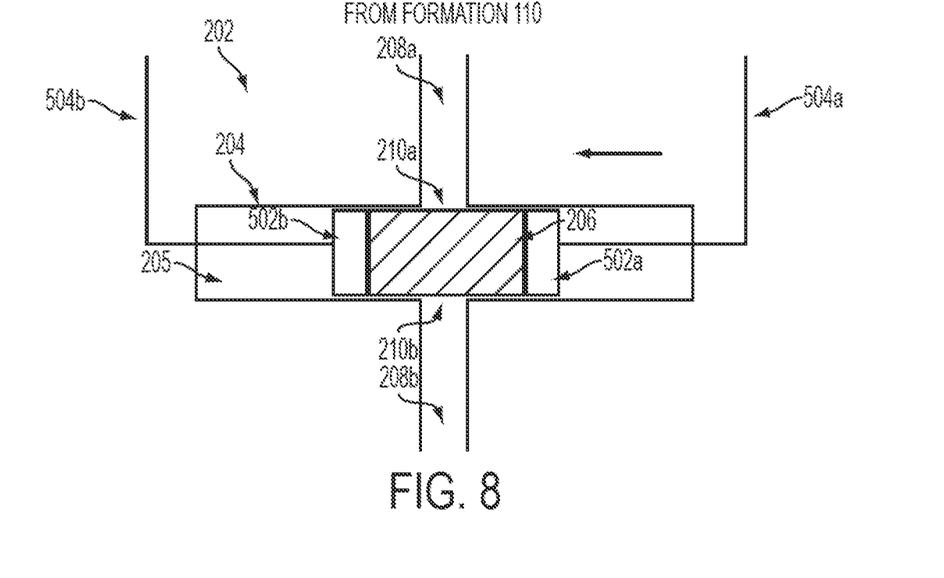
FIG. 8 is a cross-sectional view of a closed liquid valve assembly actuated by pistons according to one aspect of the present invention.
Figure 9:
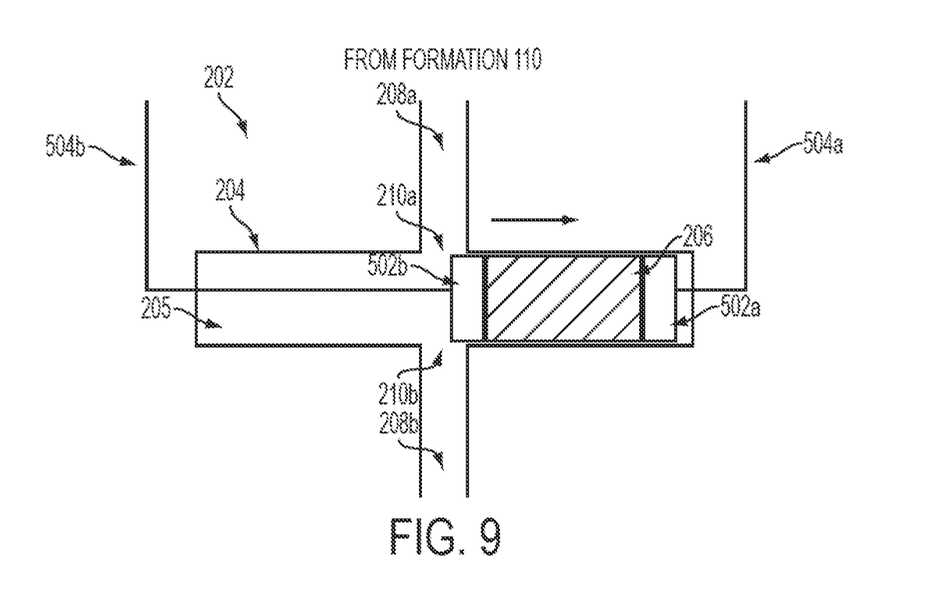
FIG. 9 is a cross-sectional view of an open liquid valve assembly actuated by pistons according to one aspect of the present invention.

In additional or alternative aspects, one or more pistons can actuate the liquid valve assembly 202. FIGS. 8-9 are cross-sectional views of a liquid valve assembly 202 actuated by pistons 502a, 502b. Control lines 504a, 504b can communicate pressure to the respective pistons 502a, 502b. Communicating pressure to the piston 502a via the control line 504a can cause the piston 502a to apply a force to the liquid valve 206 in the direction of the openings 210a, 210b, as indicated by the leftward arrow in FIG. 8. Applying the force to the liquid valve 206 in the direction of the openings 210a, 210b can close the liquid valve assembly 202. Communicating pressure to the piston 502b via the control line 504b can cause the piston 502b to apply a force to the liquid valve 206 in a direction away from the openings 210a, 210b, as indicated by the rightward arrow in FIG. 9. Applying the force to the liquid valve 206 in the direction away from the openings 210a, 210b can open the liquid valve assembly 202.

Figure 10:
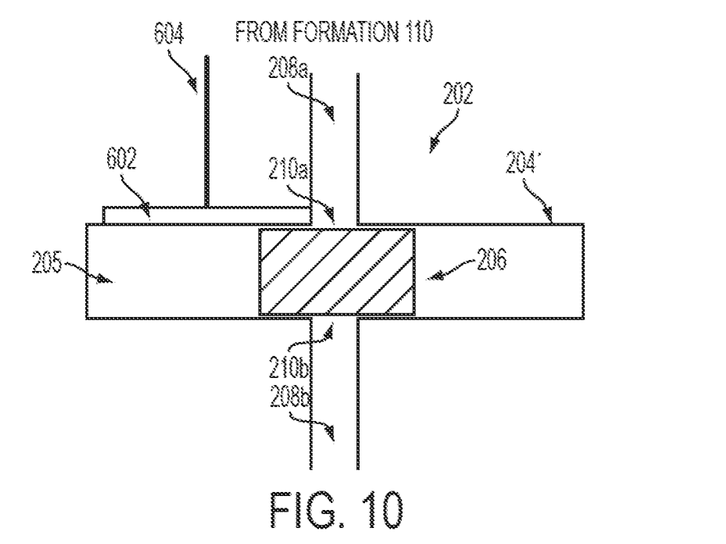
FIG. 10 is a cross-sectional view of a closed liquid valve assembly actuated by a compressible housing according to one aspect of the present invention.
Figure 11:
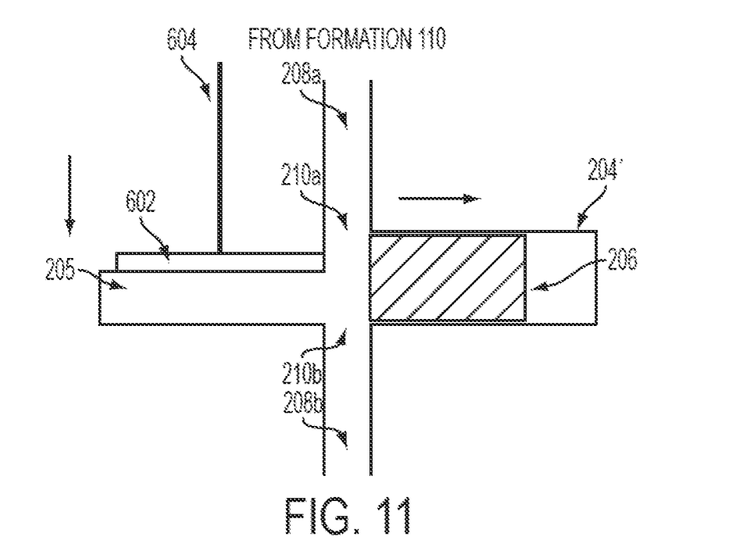
FIG. 11 is a cross-sectional view of an open liquid valve assembly actuated by a compressible housing according to one aspect of the present invention.

In additional or alternative aspects, a liquid valve assembly 202 can be actuated by compressing a portion of the housing 204. For example, FIGS. 10-11 are cross-sectional views of a liquid valve assembly 202 with a compressible housing 204'. The housing 204' can be formed from any suitable flexible or compressible material. The flexible or compressible material can allow the housing 204' to be compressed in response to a force applied the housing 204'. The housing 204' can return to an original shape in response to the cessation of the applied force.

A compressing plate 602 or other suitable rigid body or structure can be positioned adjacent to the housing 204'. A control line 604 or other suitable source of force or pressure can communicate pressure and/or apply force to the compressing plate 602 in a direction of the housing 204', as indicated by the downward arrow in FIG. 11. The compressing plate 602 can apply force to the housing 204'. Applying force to the housing 204' can compress the housing 204'. Compressing the housing 204' can exert sufficient force on the liquid valve 206 to cause the liquid valve 206 to move away from the openings 210a, 210b. The movement of the liquid valve 206 in response to the compression of the housing 204' is depicted by the leftward arrow in FIG. 11. Moving the liquid valve away from the openings 210a, 210b can allow fluid to flow between the passageways 208a, 208b and the inner chamber 205.

Figure 12:
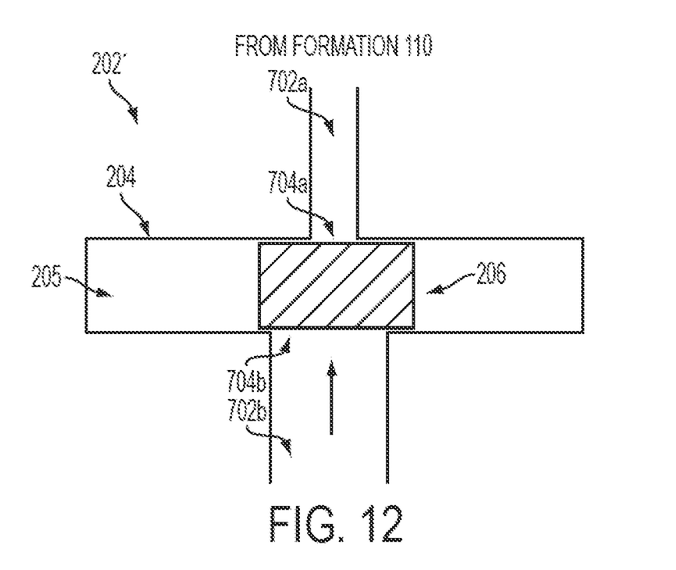
FIG. 12 is a cross-sectional view of a closed liquid check valve assembly according to one aspect of the present invention.
Figure 13:
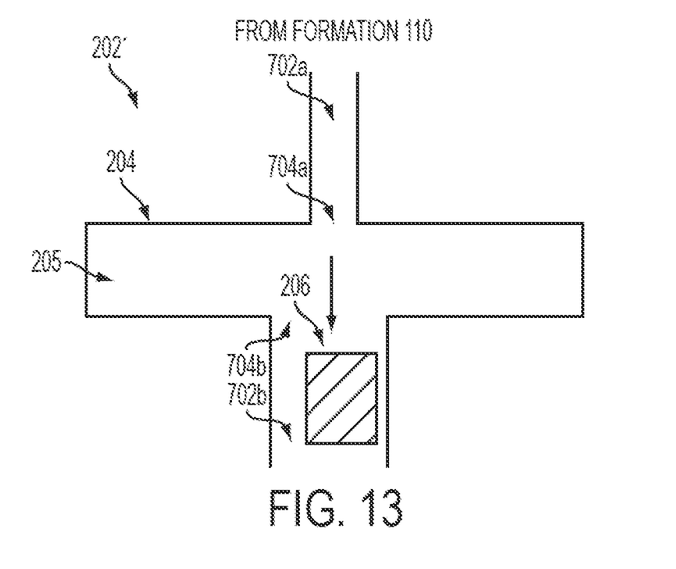
FIG. 13 is a cross-sectional view of an open liquid check valve assembly according to one aspect of the present invention.

In additional or alternative aspects, a liquid valve 206 can be used in a liquid check valve assembly. FIGS. 12-13 are cross-sectional views of a liquid check valve assembly 202'. The liquid check valve assembly 202' can include openings 704a, 704b to respective passageways 702a, 702b. Injecting fluid in the direction of the opening 704a toward the formation 110, as depicted by the upward arrow in FIG. 12, can cause the liquid valve 206 to block the opening 704a. The passageway 702a and the opening 704a and can each have a smaller diameter than passageway 702b and the opening 704b. Producing fluid from the formation 110 in the direction of the opening 704b can apply force to the liquid valve 206 in the direction of the opening 704b, as depicted by the downward arrow in FIG. 13. The opening 704b can have a sufficiently large diameter that applying the force to the liquid valve 206 in the direction of the opening 704b can cause the liquid valve 206 to flow into the passageway 702b. The liquid valve 206 flowing into the passageway 702b can allow production fluid to flow through the chamber 205 and into the passageway 702b. In some aspects, the liquid valve assembly 202 may also include a moveable magnet within the inner chamber 205 to control the yield stress of a magnetorheological fluid.

The foregoing description of the invention, including illustrated examples and aspects, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A liquid valve assembly configured for being disposed in a wellbore through a fluid-producing formation, the liquid valve assembly comprising:
    a housing defining an inner chamber and an opening adapted to allow fluid to flow between the inner chamber and a passageway;
    a liquid valve disposed in the inner chamber, the liquid valve comprising a yield stress fluid configured for preventing the fluid from flowing between the inner chamber and the passageway, wherein the yield stress fluid comprises a magnetorheological fluid; and
    an actuation mechanism configured to increase a yield stress of the magnetorheological fluid by generating a magnetic field within the inner chamber having a flux perpendicular to a flow path that includes the inner chamber and the passageway, wherein the increased yield stress is adapted to prevent a separation of the magnetorheological fluid in response to a force exerted on the magnetorheological fluid by a contact between the magnetorheological fluid and the fluid flowing into the inner chamber.

2. The liquid valve assembly of claim 1, wherein the yield stress fluid is further configured for remaining in the inner chamber in response to an application of a force to the yield stress fluid in the direction of the opening.

3. The liquid valve assembly of claim 1, wherein the actuation mechanism is further configured to selectively position the liquid valve over the opening such that the liquid valve prevents the fluid from flowing between the inner chamber and the passageway.

4. The liquid valve assembly of claim 1, wherein the liquid valve assembly is positionable in a housing of an inflow control device, the housing of the inflow control device defining the passageway.

5. The liquid valve assembly of claim 1, further comprising a permanent magnet configured to cause a separation of fluids in the inner chamber.

6. A liquid check valve assembly configured for being disposed in a wellbore through a fluid-producing formation, the liquid check valve assembly comprising:
    a housing defining an inner chamber, a first opening adapted to allow fluid to flow between the inner chamber and a first passageway, and a second opening adapted to allow the fluid to flow between the inner chamber and a second passageway; and
    a liquid valve disposed in the inner chamber, the liquid valve comprising a yield stress fluid,
    wherein the first opening has a first diameter adapted to cause the yield stress fluid to prevent the fluid from flowing between the inner chamber and the first passageway in response to the fluid exerting a force against the liquid valve in the direction of the first opening,
    wherein the second passageway has a second diameter adapted to allow the fluid to flow from the inner chamber into the second passageway in response to the fluid exerting a force against the liquid valve in the direction of the second opening.

7. The liquid check valve assembly of claim 6, wherein the yield stress fluid comprises a Bingham plastic.

8. The liquid check valve assembly of claim 6, wherein the yield stress fluid comprises a magnetorheological fluid, wherein the liquid check valve assembly further comprises an actuation mechanism configured to increase the yield stress of the magnetorheological fluid by generating a magnetic field.

9. The liquid check valve assembly of claim 6, wherein the liquid check valve assembly is configured to be disposed in a housing of an inflow control device, the housing of the inflow control device defining the first passageway and the second passageway.

10. An inflow control device configured for being disposed in a wellbore through a fluid-producing formation, the inflow control device comprising:

a housing defining a passageway; and
a liquid valve assembly, the liquid valve assembly comprising:
   an additional housing defining an inner chamber and an opening adapted to allow fluid to flow between the inner chamber and the passageway; and
   a liquid valve disposed in the inner chamber, the liquid valve comprising a yield stress fluid configured for preventing the fluid from flowing between the inner chamber and the passageway, wherein the opening has a diameter adapted to cause the yield stress fluid to prevent the fluid from flowing between the inner chamber and the passageway in response to the fluid exerting a force against the liquid valve in the direction of the opening;
wherein the housing defines an additional passageway;
wherein the additional housing further defines an additional opening adapted to allow the fluid to flow between the inner chamber and the additional passageway, wherein an additional diameter of the additional opening is adapted to allow the fluid to flow from the inner chamber into the additional passageway in response to the fluid exerting a force against the liquid valve in the direction of the additional opening.

11. The inflow control device of claim 10, wherein the yield stress fluid is further configured for remaining in the inner chamber in response to an application of a force to the yield stress fluid in the direction of the opening.

12. The inflow control device of claim 11, wherein the yield stress fluid comprises a magnetorheological fluid and wherein the actuation mechanism is configured to generate a magnetic field sufficient to increase the yield stress of the magnetorheological fluid.

13. The inflow control device of claim 10, wherein the liquid valve assembly further comprises an actuation mechanism configured to selectively position the liquid valve over the opening such that the liquid valve prevents the fluid from flowing between the inner chamber and the passageway.

14. The inflow control device of claim 10, wherein the yield stress fluid comprises a Bingham plastic.

* * * * *